United States Patent [19]

Hoshi

[11] 4,428,346
[45] Jan. 31, 1984

[54] CONTROL APPARATUS FOR ELECTRICALLY CONTROLLED INJECTION PUMP OF DIESEL ENGINE

[75] Inventor: Yoshikazu Hoshi, Ibaraki, Japan

[73] Assignee: Hitachi, Ltd., Tokyo, Japan

[21] Appl. No.: 336,099

[22] Filed: Dec. 31, 1981

[30] Foreign Application Priority Data

Jan. 9, 1981 [JP] Japan ................................ 56-1095

[51] Int. Cl.$^3$ ............................................ F02M 39/00
[52] U.S. Cl. .................................. 123/450; 123/479; 123/501; 123/458; 417/462
[58] Field of Search .............. 123/450, 479, 501, 458, 123/499; 417/462, 221, 252, 253

[56] References Cited

U.S. PATENT DOCUMENTS

| | | | |
|---|---|---|---|
| 3,506,381 | 4/1970 | Kemp | 123/450 |
| 3,834,361 | 9/1974 | Keely | 123/479 |
| 3,851,635 | 12/1974 | Murtin et al. | 123/458 |
| 4,326,672 | 4/1982 | Goloff | 239/91 |

FOREIGN PATENT DOCUMENTS 246055 1/1963 Australia .......................... 123/450

W081/00283 2/1981 PCT Int'l Appl. ................ 123/501

*Primary Examiner*—Ira S. Lazarus
*Assistant Examiner*—Magdalen Moy
*Attorney, Agent, or Firm*—Antonelli, Terry & Wands

[57] ABSTRACT

A control apparatus for an electrically controlled injection pump of a Diesel engine comprises a main controller for controlling valve opening durations of an injection quantity control solenoid valve and an injection timing control solenoid valve provided for the injection pump so that a desired quantity of fuel is supplied to the engine in an optimal injection timing and a sub-controller for controlling the injection pump in place of the main controller upon occurrence of failure of the latter. The sub-controller is constituted by an injection timing signal generator for preparing an injection timing control signal of a fixed duration applied to the timing control solenoid valve and an injection quantity signal generator for preparing an injection quantity control signal applied to the quantity control solenoid valve, which signal has a pulse width variable in dependence on a parameter representative of a desired operation state of the engine.

8 Claims, 11 Drawing Figures

ROTATIONAL SPEED OF DIESEL ENGINE

ROTATIONAL SPEED OF DIESEL ENGINE

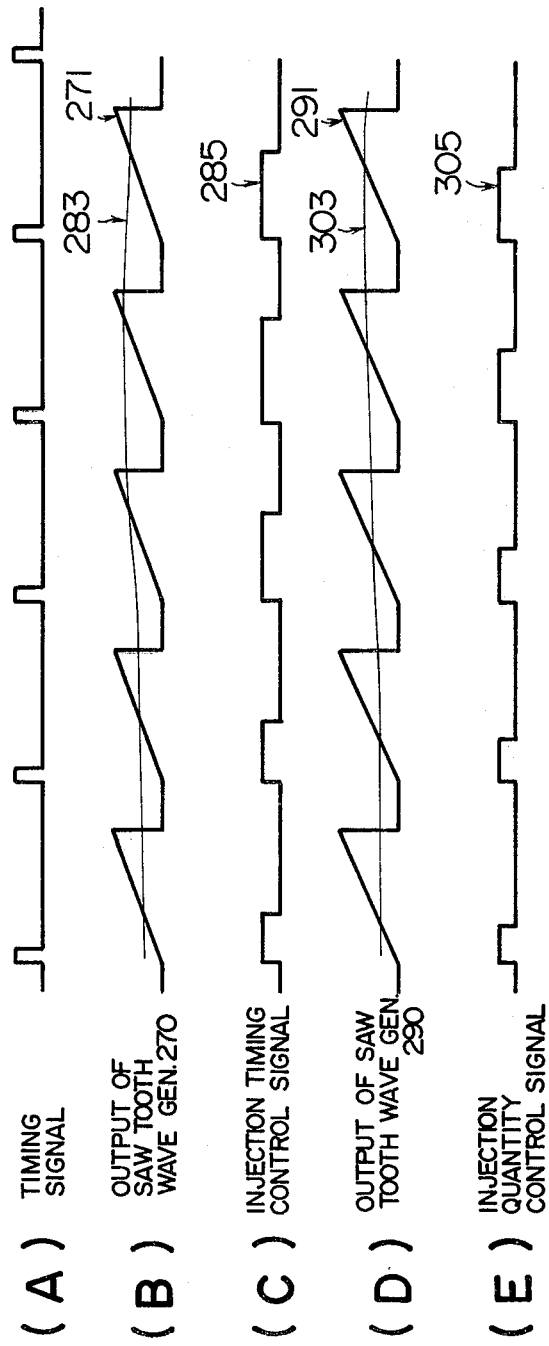

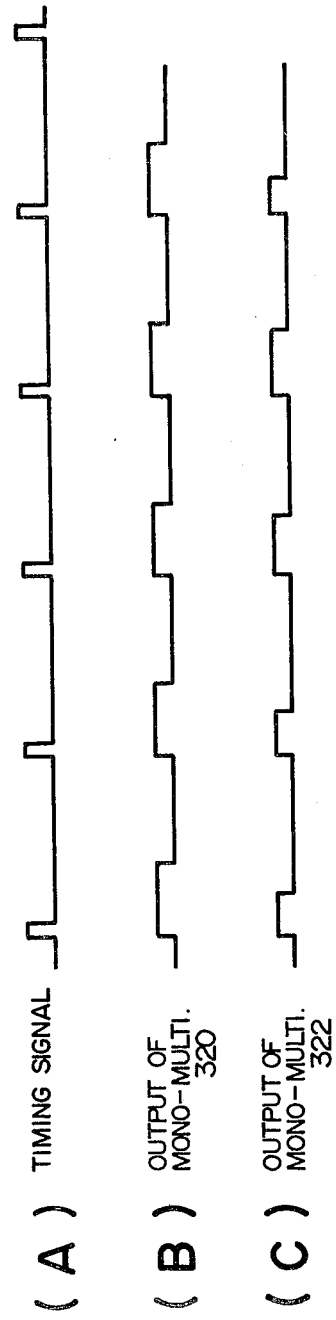

CONTROL APPARATUS FOR ELECTRICALLY CONTROLLED INJECTION PUMP OF DIESEL ENGINE

The present invention relates to a control apparatus for an electrically controlled injection pump of a Diesel engine provided with an auxiliary control apparatus which is put into operation in case of emergency. More particularly, the invention concerns a control apparatus for an electrically controlled injection pump which includes a main controller for controlling valve opening durations of solenoid valves provided for a high pressure injection pump so that fuel is supplied to the Diesel engine in optimal injection quantity and timing and an auxiliary controller which is put into operation upon occurrence of failure or malfunction in the main controller to thereby assure operation of the electrically controlled injection pump in a satisfactory manner.

Heretofore, there has been known a fuel supply control apparatus for a gasoline engine in which fuel is injected into an intake manifold of the engine through an electro-magnetic or solenoid valve at a low pressure. With such fuel supply control apparatus, the fuel supply is effected in synchronism with rotation of the engine with the quantity of fuel supplied per one cycle of the engine for each solenoid valve being determined by the valve opening duration of the solenoid valve. In the case of the gasoline engine in which the valve opening duration of the solenoid valve is determined with accuracy by a control system in dependence on the amount or quantity of air sucked in the engine, the ratio in weight between sucked air and injected fuel, i.e. the air-fuel ratio has to be controlled in a limited narrow range, in order to attain a high operation efficiency of the engine and a required purification of exhaust gas.

Further, there has been known a control system of this kind in which an auxiliary control means is additionally incorporated and adapted to be operated in the event of occurrence of failure in the control apparatus mentioned above for maintaining the operability of the engine until the failed control apparatus is repaired. This auxiliary control means which may be referred to as the emergency control apparatus is operative to open the injection valve cyclically for a predetermined time in synchronism with the rotation of the engine.

A typical example of the control system mentioned just above is disclosed in Japanese Patent Application Laid-Open No. 123728/78 filed on Apr. 5, 1977 in the name of Nihon Densoh Inc. and published (laid opened) on Oct. 28, 1978.

In the gasoline engine, the range of air-fuel ratio in which combustion can take place is relatively narrow. Accordingly, when a throttle valve is closed by releasing the acceleration pedal from the actuated position while the injection valve is opened for a predetermined time in synchronism with the rotation of the engine, the air-fuel mixture is excessively enriched, resulting in that the air-fuel ratio is excessively low and out of the combustion range, involving decrease in the output power and hence the rotational speed of the engine. In other words, in the gasoline engine, regulation of rotational speed is possible in a relatively wide range by controlling the position of the throttle valve even when supply of fuel of a certain quantity is maintained for each cycle of the engine.

However, in the case of the Diesel engine, difficulty is encountered in using the emergency overriding apparatus (auxiliary control means) disclosed in the application cited above for the reasons described below. First, the electrically controlled injection pump which is adapted to effect fuel injection through the electromagnetic or solenoid valve controlled by a pulse signal has not been realized successfully because the pressure required for fuel injection in the Diesel engine is very high on the order of 200 Kg/cm$^2$. Certainly, there has been proposed an electrically controlled injection pump which incorporates electromagnetic or solenoid valves controlled by a pulse signal for a Diesel engine. For example, reference is to be made to Japanese Patent Publication No. 3,130,718 filed Feb. 27, 1970 and published Aug. 16, 1980 in the name of Arbert Basch Gesellschaft mit Beschränkter Haftung (GmBH) claiming the priority based on German Patent Application P 1910112.3 filed Feb. 28, 1969. However, the fuel injection pressure of this electrically controlled injection pump is low.

Further, the range of air-fuel ratio of the Diesel engine is very wide as compared with that of the gasoline engine, and the output power of the Diesel engine can be controlled only in dependence on the quantity of supplied fuel, because all the fuel as supplied undergoes combustion.

More particularly, in the Diesel engine, there is such a tendency that a load torque of the engine per se is increased more or less as the rotational speed is increased. On the other hand, the speed of the pump plunger is increased in proportion to the rotational speed, involving an increased fuel injection quantity. As the consequence, torque of the engine tends to be increased as a function of the rotational speed. In reality, there is such a relationship between the load torque and the engine torque as illustrated in FIG. 1. In FIG. 1, a steady line and a dotted line show a load torque and an engine torque, respectively. As can be seen, when the rotational speed is varied and increased slightly (from $N_0$ to $N_1$), difference ($\Delta T_1$) between the engine torque and the load torque is increased, which in turn brings about further increasing in the rotational speed. On the contrary, when the rotational speed becomes lowered (from $N_0$ to $N_2$), the difference ($\Delta T_2$) between the load torque and the engine torque is inverted, causing the rotational speed to be further lowered. In other words, the Diesel engine exhibits engine torque characteristic ramping upwardly as a function of the rotational speed, and the rotational speed can not be stabilized. Thus, it is necessary to control the engine torque through the corresponding control of the fuel supply quantity, as is illustrated in FIG. 2. In FIG. 2, a steady line and a dot-and-dashed line show a load torque and a controlled engine torque, respectively. For this reason, the emergency overriding apparatus designed for driving the injection pump in the event of failure in the inherent control apparatus for the electrically controlled injection pump is required to control the injection quantity of fuel for controlling the rotational speed of the engine. Thus, it has been impossible to use the emergency overriding control apparatus (i.e. the auxiliary control apparatus) of the gasoline engine for the Diesel engine.

An object of the present invention is to provide a control system for an electrically controlled fuel injection pump incorporating therein solenoid valves (electro-magnetic valves) of a Diesel engine which system includes an auxiliary control apparatus (sub-controller) for assuring satisfactory operation of the injection pump even when the main control apparatus (i.e. main controller circuit) becomes inoperative.

In view of the above and other objects which will become more apparent as description proceeds, there is proposed according to an aspect of the invention a control system for an electrically controlled injection pump of a Diesel engine which system comprises a main controller for controlling the opening durations of an injection quantity control solenoid valve and an injection timing control solenoid valve of the fuel injection pump in such a manner that a desired quantity or amount of fuel is injected in an optimal injection timing and an auxiliary controller (sub-controller) for replacing the main controller upon occurrence of failure or malfunction in the latter. The sub-controller includes a timing pulse generator circuit for producing an injection timing control signal of a fixed pulse width to be applied to the injection timing control solenoid valve and an injection quantity control pulse generator circuit for producing an injection quantity control pulse signal applied to the injection quantity control valve and having a pulse width variable in dependence on the degree of actuation of an accelerator pedal.

The above and other objects, features and advantages of the present invention will be more clear from the following description with reference to the accompanying drawings, in which:

FIG. 1 graphically illustrates load characteristics of a Diesel engine;

FIG. 2 graphically illustrates controlled torque characteristics of the Diesel engine;

FIG. 10 shows a timing chart for illustrating operations of the main controller shown in FIG. 9; and FIG. 11 shows a timing chart for illustrating operations of a sub-controller constituting another part of the control apparatus shown in FIG. 7.

Figure 1:
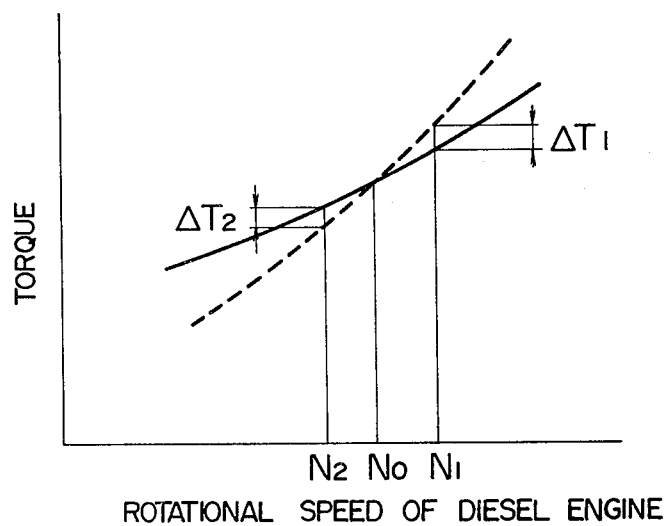

The invention will be described by referring to the drawings.

FIGS. 3 to 6 shows in sectional views a typical example of an electrically controlled injection pump to which the present invention is to be applied. The injection pump shown in FIGS. 3 to 6 is disclosed in U.S. patent application Ser. No. 304,359 filed on Sept. 22, 1981 and EPC Patent Application No. 81107263.6 filed on Sept. 15, 1981 under the title "Injection Pump".

Referring now to FIGS. 3 to 6, an injection pump to which this invention is applied has a rotor 10 adapted to be driven by a drive shaft 4 which is rotated by a crankshaft of the engine through a belt in synchronism with the engine. At one end of rotor, provided are a pair of plungers 12, 14 slidably received by radial bore 16, roller shoes 18, 19 disposed at the outer sides of respective plungers 12, 14 and rollers 20, 22 associated with these shoes 18, 19. The plungers 12, 14 roller shoes 18, 19 and the rollers 20, 22 rotate as a unit with the rotor 10.

At the outer periphery of the rollers 20, 22, disposed is a cam ring 24 secured to a housing 26 and provided on its inner peripheral surface with a convexed and concaved cam contour 28, 30, 32, 34, 36, 38. The rotor 10 is adapted to rotate on the inner peripheral surface of a sleeve 40 mounted in a sleeve holder 42 and fixed to the housing 26.

At the inside of the rotor 10, formed are first pressure chamber 44 which is defined by two opposing plungers 12, 14 and the left end surface of a free piston 46 which is received by the central axial bore 48. A second pressure chamber 50 which is defined by the right end surface of the free piston 46 and a stopper 52 which is fixed to the right end of the axial bore 48 to stop the leak of the fuel.

The plungers 12, 14, roller shoes 18, 19, rollers 20, 22 and the cam ring 24 in combination constitute a pressure mechanism which is in communication with the first pressure chamber 44. The second pressure chamber 50 is in communication with a discharge passage 54 formed in the radial direction of the rotor 10.

Figure 2:
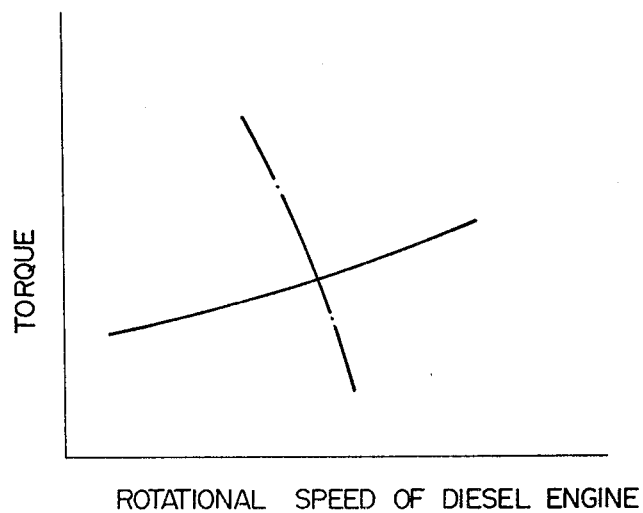
Figure 4:
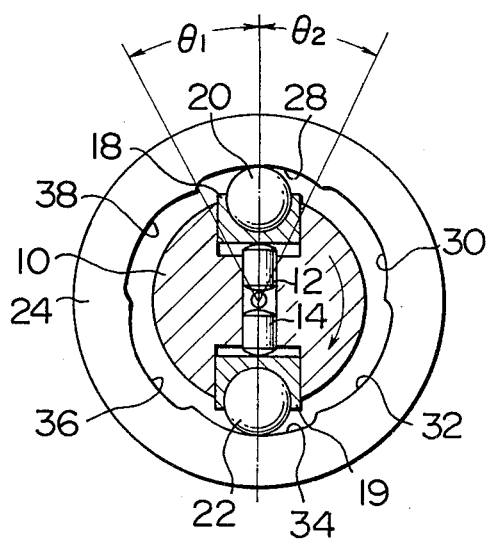
FIG. 4 is a sectional view taken along the line IV—IV of FIG. 3.
Figure 5:
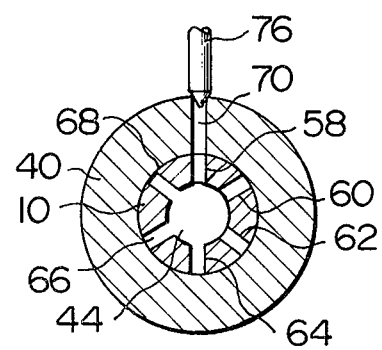
FIG. 5 is a sectional view taken along the line V—V of FIG. 5.
Figure 6:
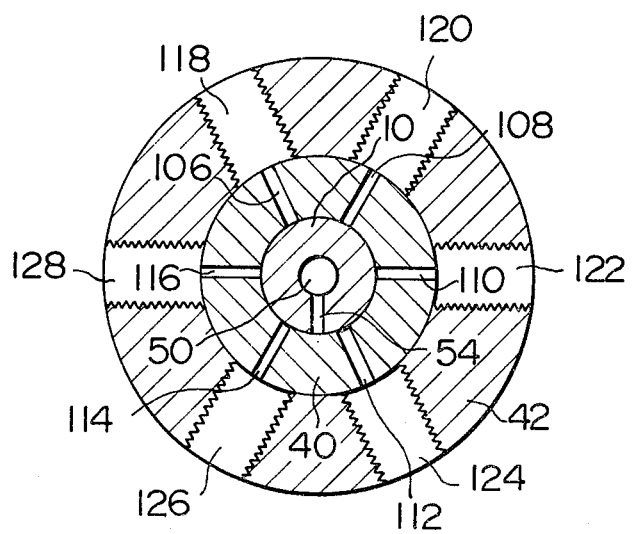
FIG. 6 is a sectional view taken along the line VI—VI of FIG. 3.

Referring to FIG. 4, the pressure mechanism is adapted to produce in accordance with the rotation of the rotor 10 in which the mechanism is incorporated, a suction period $\theta_1$ for sucking the fuel and a compression period $\theta_2$ for compressing and discharging the fuel. The embodiment shown in FIG. 2 is a fuel injection pump for an internal combustion engine having 6 (six) cylinders. Thus, 6 (six) cam contours 28-38 are formed on the inner peripheral surface of the cam ring 24 at a constant circumferential pitch corresponding to the 6 cylinders. As will be apparent later, the suction period $\theta_1$ and the discharge period $\theta_2$ are determined in accordance with the configuration of the cam contour 28-38 of the cam ring 24 and the amount of liquid or fuel sucked into the first pressure chamber 44.

Figure 3:
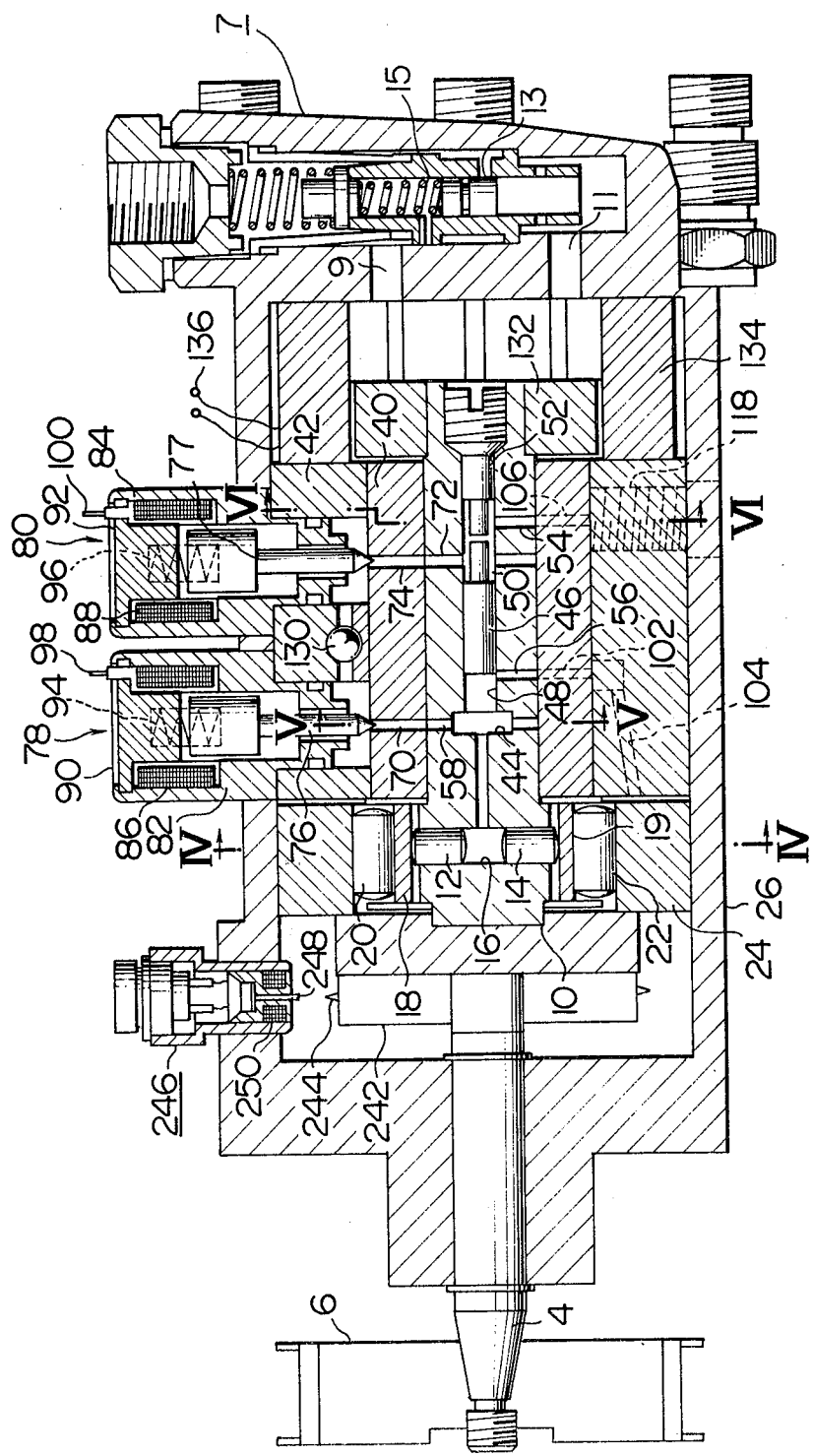
FIG. 3 is a vertical sectional view of a typical example of an injection pump to which the invention is applied.

FIG. 3 shows the injection pump in the state after completion of compression period or in the state in the suction period. More specifically, the free piston 46 has been displaced to the right considerably so that the first chamber 44 is opened to a spill port 56 formed in the radial direction of the rotor 10.

Referring to FIGS. 3 to 6 showing the injection pump in the suction period, there are provided a plurality of first radial passages 58, 60, 62, 64, 68 communicated with the first pressure chamber 44. The number of the radial passages 58, 60, 62, 64, 66, 68 corresponds to the number of the cylinders which is, in this case, 6. One of these radial passages 58-68 is in communication with a first stationary passage 70 formed in the sleeve 40. Similarly, one of a plurality of second radial passages 72 formed in communication with the second pressure chamber 50 is also in communication with a second stationary passage 74 formed in the sleeve 40. The number of the second radial passages 72 also corresponds to the number of the cylinders which is, in this case, 6. The ends of the first and the second stationary passages 70, 74 are adapted to be colsed by armatures 76, 77 of first and second solenoid valves 78, 80, respectively.

The solenoid valves 78, 80 have a substantially identical structure which includes the armatures 76, 77 mounted in casings 82, 84 for movement in the up and down directions as viewed in the drawings. This vertical movement of each armature 78, 80 is effected by turning on and off the corresponding solenoid valves 78 and 80.

Each solenoid valve 78, 80 is provided with a coil 86 or 88, stationary magnetic pole 90 or 92 and a spring 94 or 96 disposed between the stationary magnetic pole and the armature. In the normal state in which the solenoid coils 86 and 88 are kept in off state, the armature 76, 77 is pressed by the springs 94 and 96 downwardly to keep the valve in the closing position.

In each solenoid valve 78, 80, as the coil 86 and 88 are energized by the electric current supplied through the terminals 98 and 100, a path of magnetism is formed to include the stationary magnetic poles 90, 92, casings 82, 84 and armatures 76, 77, so that the armatures 76, 77 are moved upwardly overcoming the force of the spring 94, 96, thereby to open the valve. As a result of the opening of the valve 78, 80, the end of the first stationary passage 70 or the second stationary passage 74 is released. In this case, it is not always necessary to make the timings of openings of the solenoid valves 78, 80 coincide with each other. As these valves are opened, the fuel pressurized to a predetermined pressure by a fuel feed pump such as a vane-type fuel feed pump 7 driven by the engine or an electric motor is charged into the first and the second pressure chambers 44, 50 through the opened first and second stationary passages 70, 74, via the first and second radial passages 58, 72 communicated with these stationary passages 70, 74.

The fuel feed pump 7 includes an inlet 9 and an outlet 11. The inlet 9 is connected to a fuel tank through an oil filter. The inlet 9 and the output 11 are interconnected through an orifice 13, the diameter of which is determined in dependence on a spring load valve means 15 and controls a pressure of the fuel at the outlet 11. The outlet 11 is communicated to a fuel supply port.

The aforementioned spill port 56 is communicated with low-pressure side of the pump through a spill passage 102 formed in the sleeve 40 and a discharge passage 104 formed in the sleeve holder 42. On the other hand, output passages 106, 108, 110, 112, 114 and 116, the number of which is, in this case 6, are formed radially in the sleeve 40. The discharge passage 54 formed in the rotor 10 is made to communicate with one of these 6 radial output passages 106-116 and further with connection ports 118, 120, 122, 124, 126, 128 formed in the sleeve holder 42. Each connection port 118-128 is communicated with the fuel injection valve of each cylinder through a conduit (not shown).

The solenoid valves 78, 80 are communicated at their upstream sides with the fuel supply port 130, so that the fuel under regulated pressure is supplied to the first pressure chamber 44 and the second pressure chamber 50 via the first and second stationary passages 70 and 74, as respective solenoid valves 78, 80 are opened.

A pulser 132 attached to the right-side end of the rotor 10 is adapted to be rotated as a unit with the latter. A detector 134 for cooperating with the pulser 132 is attached to the outer periphery of the latter. The combination of the pulser 132 and the detector 134 may be a device which is of the same type as the rotation detector of contact-less ignition device for a spark ignition type engine. In this case, the combination of the pulser 132 and the detector 134 is used to produce an electrical signal at a detection output terminal 136 when the rotor 10 is in the timing for commencement of the fuel supply to the pump rotor, i.e. in the period at which each solenoid valve 78, 80 starts to open to permit the supply of the fuel.

In the injection pump of this embodiment, the control of the amount of sucked fuel in the suction period $\theta_1$ shown in FIG. 4 is conducted in a manner explained hereinunder.

An electronic controller, which is not shown operates, upon receipt of the signal representing the timing of commencement of the suction period coming from the detection terminal 136, to energize both of the first solenoid valve 78 and the second solenoid valve 80 simultaneously or with a certain time difference, without delay or at a predetermined time lag, thereby to open the valves 78, 80. As the first solenoid valve 78 is opened, the fuel under a suitable regulated pressure is supplied to the first pressure chamber 44 from the fuel supply port 130 through the first stationary passage 70 and the first radial passage 58. At this moment, the rollers 20, 22 and the roller shoes 18, 19 are not restricted by the cam contour (suction period $\theta_1$ in FIG. 4), so that two plungers 12, 14 are allowed to be displaced radially outwardly. Therefore, the fuel is charged into the first pressure chamber 44 at a rate which is determined by various factors including the opening period of the first solenoid valve 78, size of the passage and the pressure difference between the fuel pressure at the fuel supply port 130 and that in the first pressure chamber 44. Namely, the suction characteristic is determined taking into the centrifugal force acting on the plungers 12, 14 or other factors, irrespective of whether the fuel pressure at the supply port 130 is kept constant independently of the rotation speed of the pump or varied depending on the rotation speed. Practically, however, the rate of flow of the fuel into the first pressure chamber 44 is determined solely by the opening period of the first solenoid valve 78.

Similarly, the amount of liquid (fuel) charged into the second pressure chamber 50 is determined by the timing of opening of the second solenoid valve 80. The liquid (fuel) which has been charged into the second pressure chamber 50 acts to displace the free piston 46 to the left as viewed in FIG. 3 to increase the pressure in the first pressure chamber 44, thereby to displace the plungers 12, 14 radially outwardly. As will be explained later, the spill port 56 is closed as the free piston 46 is moved to the left.

The free piston 46 is moved to the left in accordance with the amount of fuel supplied to the second pressure chamber 50. In addition, the plungers 12, 14 are displaced radially outwardly by an amount corresponding to the addition of the liquid to the first pressure chamber 44.

In the operation described heretofore, the pressurizing mechanism constituted by the plungers 12, 14, roller shoes 18, 19, rollers 20, 22 and the cam ring 24 operates to realize an initial period in which the suction of the fuel into respective chambers is allowed without any restriction.

The discharging operation of the injection pump in the compression period $\theta_2$ shown in FIG. 4 will be explained hereinunder.

In the compression period, as shown in FIG. 4, the roller 20, 22 is urged radially inwardly upon contact with the cam contour, so that the plungers 12, 14 are moved radially inwardly.

In this period, the communication between the first radial passage 58 and the first stationary passage 70, as well as the communication between the second radial passage 72 and the second stationary passage 74, is interrupted.

On the other hand, the discharge passage 54 leading from the second pressurizing chamber 50 is brought into communication with one of the output passages 106 the number of which corresponds to the number of cylinders of the engine. This output passage 106 is connected to the corresponding connection port 118 (See FIG. 6) which in turn is connected to the fuel injection valve of the corresponding cylinder of the engine through the pipe connected thereto. In this compression period, the spill port 56 formed adjacent to the first pressure chamber 44 is kept closed by the free piston 46.

As the rotor 10 rotates in this state of communication, the pressure of the liquid (fuel) in the first pressure chamber 44 is increased as a result of the radially inward movement of the plungers 12, 14 caused by the cam contour. When the pressure of the liquid in the first pressure chamber 44 is increased, the spill port 56 is still kept closed by the side surface of the free piston 46, so that the fuel in the second pressure chamber 50 is also pressurized through the action of the free piston 46. The fuel in the second pressure chamber 50 thus pressurized is then injected from the fuel injection valve of the corresponding cylinder, through the discharge passage 54, output passage 106 and the connection port 118.

As a result of the discharge of the fuel from the second pressure chamber 50, the free piston 46 is moved to the right to take the state as shown in FIG. 1. In this state, the spill port 56 is opened to that the pressurized fuel in the first pressure chamber 44 is discharged to the low-pressure side of the pump through the spill port 56, so that the pressure in the first pressurizing chamber 44 is lowered drastically. As the spill port 56 is released, the transmission of the pressure to the second pressure chamber 50 through the free piston 46 is ceased to complete the compression stroke.

As the rotor 10 is further rotated to commence the next suction period, the free piston 46 is moved to the left by an amount corresponding to the amount of supply of the fuel to the second pressure chamber 50. This amount of the liquid (fuel) charged into the second pressure chamber 50 corresponds to the amount of fuel discharged through the discharge passage in the subsequent compression period until the spill port 56 is opened. Thus, the amount of fuel charged into the second pressure chamber 50, controlled by the opening period of the solenoid valve 80, is the amount of the injection (discharge) in the compression period.

On the other hand, the amount of fuel sucked into the first pressure chamber 44 in accordance with the control of opening period of the solenoid valve 78 is related to the determination of the injection timing, i.e. the timing at which the compression is started. Namely, the amount of the liquid supplied to the first pressure chamber 44 determines the radial position of the plungers 12, 14 and, hence, the radial position of the roller 20, 22. In consequence, the timing at which the roller 20, 22 is contacted by the cam contour, i.e. the timing at which the compression period $\theta_2$ is commenced, is determined by the amount of liquid supplied into the first pressure chamber 44.

This operation will be explained in more detail with specific reference to FIG. 4.

Referring to FIG. 4, the cam ring 24 is kept stationary and is provided on its inner peripheral surface with a cam contour portion for determining the suction period $\theta_1$ and the cam contour portion for determining the compression period, $\theta_2$ which are formed alternatively. The cam contour portion for the suction period $\theta_1$ has such a configuration as not to restrict the radially outward movement of the plungers 12, 14, roller shoes 18, 19 and the rollers 20, 22, whereas the cam contour portion for the compression period $\theta_2$ is so shaped as to displace the rollers 20, 22 and, hence, the roller shows 18, 19 radially inwardly as the rotor 10 rotates, thereby to cause a radially inward displacement of the liquid in the first pressure chamber 44.

When the opening period of the first solenoid valve 78 is long, to permit a large amount of fuel to be supplied to the first pressurizing chamber 44, the radial displacement of the plungers 12, 14, roller shoes 18, 19 and the rollers 20, 22 are increased correspondingly so that the roller 20, 22 come into contact with the inner surface of the cam ring 24 at an earlier period to permit an earlier commencement of the compression period $\theta^2$, resulting in earlier compression and discharge of the fuel.

When the opening period of the second solenoid valve 80 is long to permit a large amount of fuel to be charged into the second pressure chamber 50, the position of the free piston 46 is offset to the left so that the plungers 12, 14 are also offset radially outwardly for a given amount of the fuel supplied to the first pressure chamber 44. In consequence, the compression period is commenced at an earlier timing, for the same reason as stated before. In this case, the time length of the compression and discharge period $\theta_2$ itself does not change substantially even when the amount of fuel charged into the first pressure chamber 44 is changed.

Namely, while the amount of injected fuel is the amount of fuel supplied to the second pressure chamber 50, the timing of completion of the injection (compression and discharge) is determined by the minimum radius portion of the inner peripheral surface of the cam ring 24, provided that the amount of supply to the first pressurizing chamber 44 is zero. In other words, the timing of commencement of the injection is made earlier as the amount of fuel injection, i.e. the amount of fuel supplied to the second pressure chamber 50, is increased, while the timing at which the injection is finished is unchanged. By supplying the fuel to the first pressurizing chamber 44, the timing of commencement of the injection can be made earlier by an amount or time length corresponding to the amount of fuel supply to the first pressure chamber 44. In this case, however, there is a possibility that the fuel sucked into the first pressure chamber 44 is excessively pressurized in the compression period or compressed over an excessively long stroke. The aforementioned fuel spill port 56 is provided to suitably regulate the timing of completion of the injection, overcoming the above stated problem.

Thus, the fuel of an amount corresponding to that sucked into the second pressurizing chamber 50 is injected in the injection period which starts at a timing determined by the amounts of fuel sucked into the first and the second pressure chambers 44, 50. Then, the free piston 46 comes to open the spill port 56 to release all part of the fuel in the first pressure chamber 44 into the discharge passage 104 through the spill port 56, so that the pump resumes the starting condition. This operation is repeated successively in accordance with the cam contour of the cam ring 24.

Figure 7:
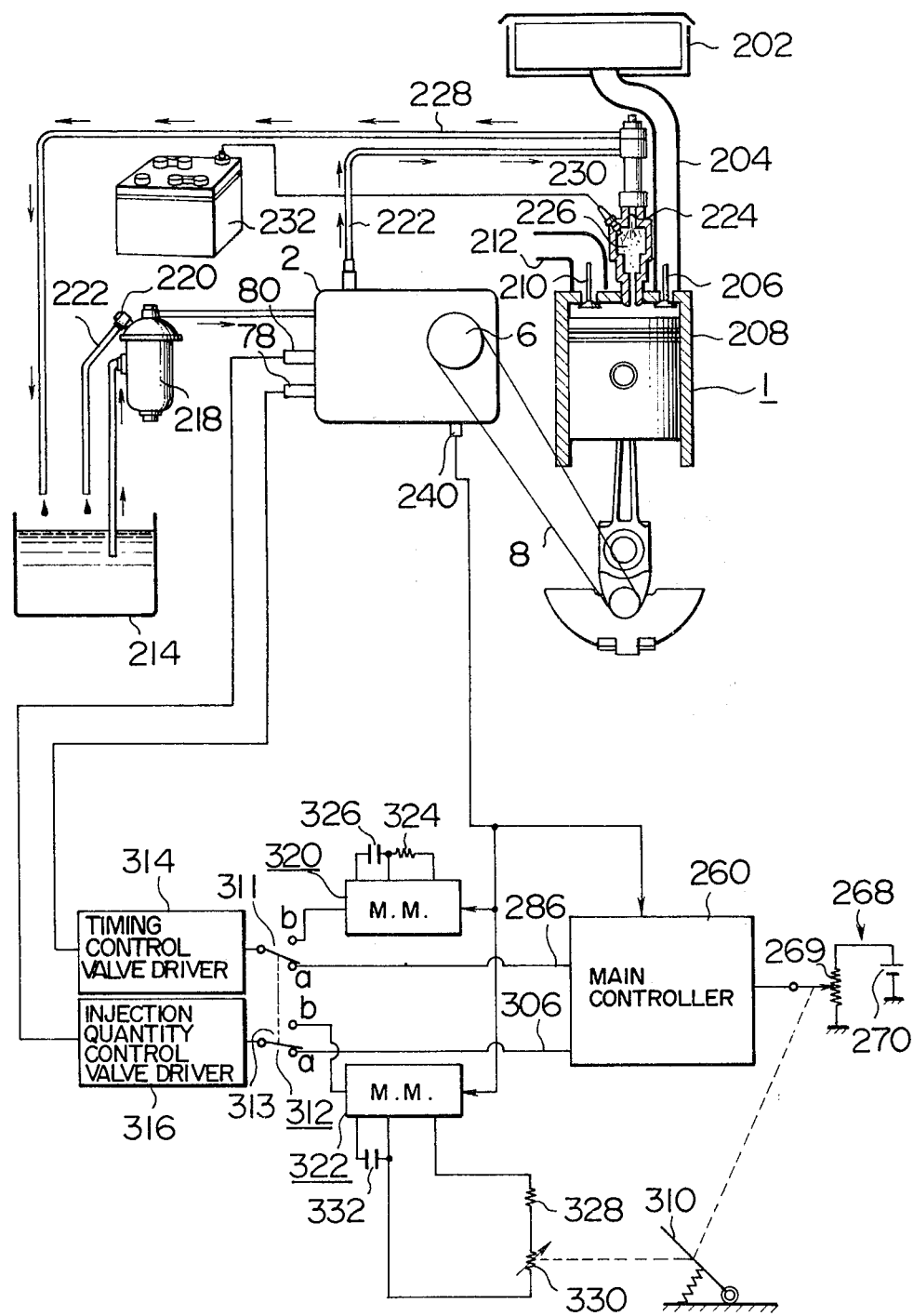
FIG. 7 is a system diagram to show a general arrangement of a control apparatus for an electrically controlled injection pump of a Diesel engine according to an exemplary embodiment of the present invention.

FIG. 7 shows, in a system diagram, a typical example of a control apparatus for the electrically controlled injection pump embodied according to the invention to be used in a Diesel engine for a motor vehicle, by way of example, wherein fuel quantity as well as injection timing is controlled by the associated solenoid valves described above, respectively. It is assumed that the injection pump 2 is of the structure illustrated in FIGS. 3 to 6.

Referring to FIG. 7, air sucked through air cleaner 202 is fed to a cylinder 208 through an intake manifold 202 and a suction valve 206. Combustion product gas produced due to combustion in the cylinder 208 is discharged to an exhaust manifold 212 through a discharge valve 210.

In a fuel supply system, the fuel contained in a fuel tank 214 is fed to an oil filter 218. An excess of fuel having passed through the oil filter 218 is fed back to the fuel tank through an overflow valve 220 and a return pipe 222, so that a required quantity of fuel is supplied to the injection pump 2. The fuel pressurized by the fuel pump 2 is supplied to the fuel injection valve 224 installed in a pre-combustion chamber 226 from the output passage 106 and the connection port 118 of the fuel injection pump (FIGS. 3 and 6) through a conduit 222. Fuel in excess of that required for the injection is fed back to the fuel tank 214 from the valve 224 through a return pipe 228. Reference numeral 230 represents a pre-heating plug which is electrically energized from a battery 232 to be heated. In the illustrated embodiment, it is assumed that the Diesel engine is composed of six cylinders, although only one of them is shown in the drawing for convenience' sake.

Figure 8:
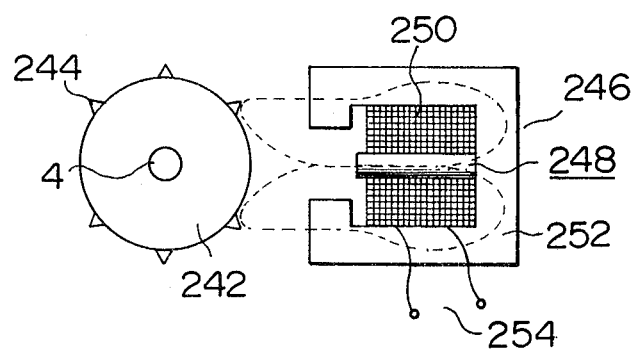
FIG. 8 shows schematically a general arrangement of a timing detector.

A driving pulley (not shown) mounted on a crank shaft of the engine is operatively coupled to a driven pulley 6 mounted on the drive shaft 4 of the injection pump 2 by means of the belt (FIG. 3), whereby the rotating power of the crank shaft is transmitted to the injection pump 2. In this manner, the injection pump 2 is adapted to be driven by the engine 1. As described hereinbefore, the injection pump 2 is composed of a rotary pump such as the vane-type fuel feed pump 7, the pressure chamber 44, 50 for receiving the discharge pressure when the rotary pump is driven, the free piston 46 disposed movably in the pressure chamber for dividing it into two compartments, and the other associated parts, wherein one of the pressure compartments, 50, divided by the free piston 46 is supplied with fuel through the injection control solenoid valve (i.e. electro-magnetic valve) 80, while the other compartment 44 is supplied with fuel through the injection timing control solenoid valve 78. The injection pump 2 is provided with a timing detector 240 for detecting the fuel injection timing. The timing detector 240 is composed of a pulser disk 242 made of a non-magnetic material and fixedly mounted on the driving shaft 4 of the injection pump 2 and a detector device 246 fixedly disposed in opposition to a periphery of the pulser disk 242 with a predetermined distance therefrom, as is shown in FIGS. 3 and 8. Thus, the pulser disk 242 is rotated as the driving shaft 4 is rotated. There are fixedly disposed a plurality of projection magnetic pieces 244 on the peripheral side of the pulser disk 242 spaced with an equi-distance to one another by a predetermined angle, say, 60°. The detector device 246 is composed of a permanent magnet piece 248, a coil disposed adjacent to the permanent magnet piece 248 and a casing 252 of a magnetic material for encasing the permanent magnet piece and the coil 250. Magnetic flux produced by the permanent magnet piece 248 traverses the projections 244, the casing 252 and the coil 250, as is illustrated by broken lines in FIG. 8. The intensity of magnetic flux which traverses the coil 250 is varied as the projection 244 is displaced during rotation of the pulser disk 242. As the consequence, the signal making appearance across output terminals 254 of the coil 250 is of a pulse-like voltage signal which exhibits the greatest amplitude every time the projections 244 come closest to the detector device 246, whereby six signal pulses are produced at the output for every rotation of the driving shaft 4. Assuming now that the driving shaft is rotated once during two rotations of the crank shaft, three signal pulses are produced during a single rotation of the crank shaft. The pulse signal thus derived from the output terminal 254 is supplied to a main controller 260 as the timing signal.

The main controller 260 is so arranged as to respond to a signal supplied from a command speed detector 268 which is interlocked with an accelerator pedal 310 for commanding the engine speed and the timing pulse signal produced by the timing pulse detector 240, to thereby prepare a pulse-like injection quantity control signal and an injection timing control signal. The command speed detector 268 comprises a DC power source 270 and a variable resistor 269 connected in series to the power source 270, wherein a slider of the variable resistor 269 is operatively connected to the accelerator pedal 310 in such a manner that the voltage tapped by the slider is increased as the accelerator pedal 310 is actuated or pressed deeply. Thus, the voltage derived through the slider is proportional to the command speed.

Figure 9:
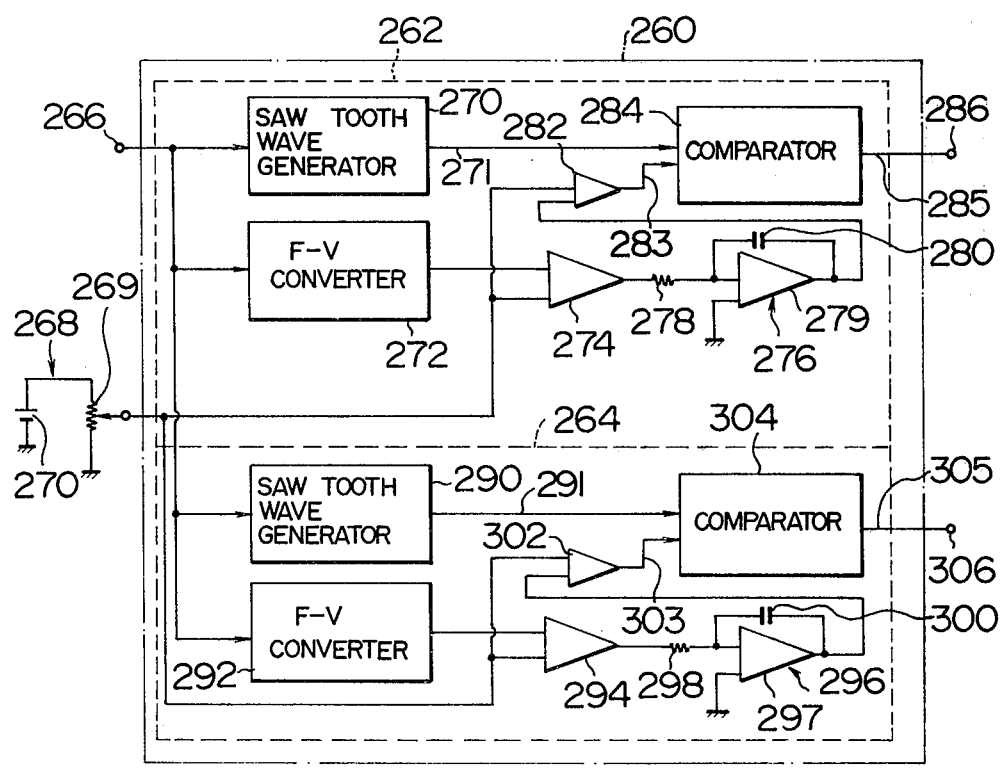
FIG. 9 shows in a block diagram a main controller constituting a part of the control apparatus shown in FIG. 7.

FIG. 9 shows a typical arrangement of the main controller 260, while FIG. 10 shows a time chart to illustrate operations of various components of the main controller, which is basically composed of an injection timing control signal generator unit 262 for producing an injection timing control signal and an injection quantity control signal generator unit 264 for producing an injection quantity control signal. In the first place, the injection timing control signal generator unit 262 will be described. The timing signal produced from the timing signal generator 240 is applied to a terminal 266 and hence to a saw tooth wave generator 270 and a frequency-to-voltage converter (hereinafter referred to as F-V converter) 272. As described hereinbefore, the timing signal (FIG. 10 (A)) is produced once every 120° of rotation of the crank shaft such that it is generated at a time point where an associated piston reaches a point above five degree before the top dead center thereof. The saw tooth wave generator 270 responds to the timing signal to thereby produce a saw tooth wave signal 271 (FIG. 10 (B)) having a predetermined ramp or slope, which signal is applied to one input of a comparator 284. The F-V converter 272 serves to smooth the timing signal to thereby produce an analog voltage signal 273 which is proportional to the frequency of the timing signal. Thus, the analog voltage output from the F-V converter 272 rises up as the rotational speed of the engine increases. In this manner, the output analog voltage signal 273 represents the rotational speed of the Diesel engine. The output voltage signal 273 from the F-V converter 272 is applied as the actual speed signal to one input of an error determining operational circuit 274, which has the other input applied with the voltage derived by the slider of the command speed detector 268 as the command speed signal. The operational circuit 274 then produces at the output thereof a difference signal in accordance with difference between the actual speed signal and the command speed signal. The difference signal is applied to an integrator 276. The output voltage from the integrator 276 is applied to an adder 282 together with the command speed signal from the command speed detector 268. Thus, the output signal from the adder 282 is a superposed voltage signal 283 (FIG. 10 (B)) in which the command speed signal is superposed with a voltage corresponding to the error or difference between the command speed signal and the actual speed signal. The output signal of the adder 282 is applied to the other input of the comparator 284.

The comparator 284 produces a pulse signal 285 (FIG. 10 (C)) which rises up in the rise-up timing of the saw tooth wave signal 271 supplied from the saw tooth wave generator 270 and disappears when the output signal from the saw tooth wave generator 271 has attained the level of the output signal from the adder 283. The output pulse signal 285 from the comparator 284 is supplied to an output terminal 286 as the injection timing control signal. In this way, as the accelerator pedal 310 is pressed deeply, the output voltage from the command speed detector 268 is increased, which means that the output voltage from the detector 268 is increased during pulse durations of the injection timing control signal and the injection quantity control signal.

The injection quantity control signal generator unit 264 is realized in a manner similar to the injection timing control signal generator unit 262 and is composed of a saw tooth wave generator 290, a F-V converter 292, an error determining operational circuit 294, an integrator 296, an adder 302 and a comparator 304. These components serve for the same functions as those of the injection timing control signal generator unit 262. More specifically, the saw tooth wave generator 290 responds to the timing signal to thereby produce as the output signal a saw tooth wave signal 290 illustrated in FIG. 10 (D). This output signal 290 is supplied to one input of the comparator 304. The saw tooth wave signal 291 has a slope which differs from that of the saw tooth wave signal 271 produced by the saw tooth wave generator 270. The timing signal is converted into an analog voltage by means of the F-V converter 292 and applied as the actual speed signal to the operational circuit 294 together with the command speed signal produced by the command signal detector 268, whereby voltage signal corresponding to difference or error between the actual and the command speed signals is produced to be supplied to the adder 302 through the integrator 296 to be added with the command speed signal. The output signal 303 from the adder 302 is applied to the other input of the comparator 304 to be compared with the saw tooth wave signal 291, resulting in that a pulse signal illustrated in FIG. 10 (E) is produced and supplied to a terminal 306 as the injection quantity control signal 305. In conjunction with the control signal generator units 262 and 264, it should be mentioned that the circuit constants of the operational circuits 274, 294 and the integrators 276, 296 are so selected that the pulse widths of the injection timing control signal 285 and the injection quantity control signal 305 have appropriate pulse widths, respectively.

It will be appreciated that the main controller may be implemented in another circuit configuration which operates on the basis of analog signals other than those mentioned above in conjunction with the circuit shown in FIG. 9 or alternatively realized in a digital control circuit operating on the basis of digital signals. Further, the injection quantity control signal and the injection timing control signal may be prepared in consideration of other parameters indicative of other operating states of the engine such as, for example, temperature of cooling water in addition to the degree of actuation of the accelerator pedal.

The control signals 285 and 305 are of the pulse signals, as described above. During the pulse width of these control signals 285 and 305, the solenoid valves 78 and 80 are opened, whereby the injection quantity of fuel as well as injection timing is correspondingly determined. To this end, the control signals 285 and 305 produced by the main controller 260 are supplied through a change-over switch 312, respectively, to a timing control solenoid valve driver circuit 314 for driving the injection timing control valve 78 and an injection control solenoid valve driver circuit 316 for driving the injection quantity control solenoid valve 80. Each of the driver circuits 314 and 316 may be constituted by a well-known amplifier circuit. The injection timing control signal and the injection quantity control signal outputted from the driver circuits 314 and 316 are supplied to the solenoid valves 78 and 80, respectively, whereby fuel is supplied from the injection pump 2 successively to the injection valves of the individual cylinders for every 120° of rotation of the crank shaft.

For taking precautions against failure of the main controller 260, it is required to provide a subcontroller which serves as an emergency unit for driving the injection pump 2 in place of the failed main controller. The sub-controller should preferably be of an inexpensive and simple circuit configuration. To this end, the sub-controller illustrated in FIG. 7 is composed of an injection timing control pulse signal generator circuit (hereinafter referred to simply as the timing signal generator) 320 and an injection quantity control pulse signal generator circuit (hereinafter referred to simply as the injection quantity signal generator) 322, both of these circuits 320 and 322 being supplied with the timing signal from the timing signal generator 240. Although the circuits 320 and 322 are shown each constituted by a mono-stable multivibrator, they may be implemented in other circuit configurations. The mono-stable multivibrator 320 includes a fixed resistor 342 and a capacitor 326 such that it is operated in the mono-stable operation mode with a time constant determined by the values of the resistor 324 and the capacitor 326. The mono-stable multivibrator 322 includes a series connection of a fixed resistor 328 and a variable resistor 330 which is operatively coupled to the accelerator pedal 310 and exhibits resistance value variable in accordance with the actuated degree of the accelerator pedal 310. Additionally, the multivibrator 320 includes a capacitor 322. Thus, the mono-stable multivibrator 322 is operated with a time constant determined by the values of the serially connected resistors 328 and 330 and the capacitor 332. The mono-stable multivibrators 320 responds to the input signal from the timing signal generator 240 to thereby switch the stable state to the astable state and is reset to the stable state upon lapse of a time corresponding to the time constant determined by the resistor 324 and the capacitor 326. In this manner, the mono-stable multivibrator 320 responds to the timing signal to thereby produce at the output a pulse signal illustrated in FIG. 11 (B). Since the time constant determined by the resistor 324 and the capacitor 326 is invariable, the duration of the output pulse of the mono-stable multivibrator 320 remains constant.

On the other hand, the mono-stable multivibrator 322 responds to the timing signal to change over its state from the stable to astable and is reset to the stable state upon elapse of a time corresponding to the time constant determined by the values of the resistors 328 and 330 and the capacitor 322. Thus, the mono-stable multivibrator 322 produces a pulse signal illustrated in FIG. 11 (C) in response to the timing signal. The value of the resistor 330 is variable. More particularly, as the accelerator pedal 310 is pressed deeply, the value of the resistor 330 is increased, involving a corresponding increasing in the time constant determined by the resistors 328 and 330 and the capacitor 332. Thus, the pulse width or duration of the output pulse signal from the mono-stable multivibrator 322 is varied in dependence on the degree of actuation of the accelerator pedal 310. It should be mentioned that the pulse signal outputted from the mono-stable multivibrator 320 corresponds to the ignition timing control signal 285, while the pulse signal outputted from the mono-stable multivibrator 322 corresponds to the injection quantity control signal 305. The output terminals of these mono-stable multivibrator are connected to the change-over switch 312 and selectively coupled to the timing control solenoid valve driver circuit 314 and the injection control solenoid valve driver circuit 316, respectively, when the ganged movable contacts of the change-over switch 312 are changed over from contacts or terminals a to terminals b.

Next, operations of the main controller and the subcontroller according to the exemplary embodiment of the invention described above will be elucidated.

In the first place, description will be made on the assumption that the man controller 260 is in a normal state. The main controller 260 produces on the basis of the timing signal and the command speed signal supplied thereto from the timing signal generator 240 and the command speed detector 268, respectively, the injection timing control signal and the injection quantity control signal which assure the optimal value of the angle of lead at which the engine 1 is operated in the optimal operation state. In this conjunction, it will be noted that the value of the angle of lead is selected properly in accordance with the design or specification of the engine 1.

Next, description will be made on operations of the timing signal generator 320 and the injection quantity signal generator 322 which take place in the event of failure or malfunction occuring in the main controller 260.

The mono-stable multivibrator 322 produces the pulse signal in response to the timing signal, which pulse signal is supplied to the injection quantity control solenoid valve driver circuit 316 when the movable contact 313 of the change-over switch 312 is closed to the contact b. In this manner, the output pulse signal from the mono-stable multivibrator 322 is made use of upon occurrence of failure in the main controller 260 in place of the injection quantity control signal which is supplied to the injection quantity control solenoid valve driver circuit 316 from the main controller in the normal operation state thereof. The time duration of the output pulse signal from the mono-stable multivibrator 322 should preferably be so selected that a sufficient quantity of fuel required for maintaining the idle rotation of the engine is supplied at a minimum or zero actuation of the accelerator pedal 310, while the pulse width of the above output pulse signal is narrower than the maximum value of the pulse width of the injection quantity control signal supplied to the injection quantity control valve 80 from the main controller in the normal operation state thereof.

On the other hand, the mono-stable multivibrator 320 supplies the pulse signal of the fixed pulse width to the timing solenoid valve driver circuit 314 in place of the injection timing control signal upon occurrence of failure in the main controller.

Operations of the mono-stable multivibrators 320 and 322 take place in the manner described above. When the operation of the engine 1 becomes uncontrollable due to failure of the main controller 260, the driver determines that the main controller 260 is abnormal and manually changes over the movable contacts 311 and 313 of the switch 312 to the contacts b from the contacts a. At that time, the timing control solenoid valve driver circuit 314 is caused to operate in response to the pulse signal of the fixed pulse width produced from the mono-stable multivibrator 320. The timing control solenoid valve 78 is opened in response to the output pulse signal from the driver circuit 314 to supply to the pressurizing chamber 44 a fixed quantity of fuel determined by the pulse width of the injection timing control signal. Thus, the timing in which the fuel supply to the engine 1 takes place also becomes fixed. On the other hand, the mono-stable multivibrator 322 produces the pulse signal whose pulse width corresponds to the actuated degree of the accelerator pedal 310. This signal is suppled to the fuel quantity control solenoid valve driver circuit 316, which in turn produces the pulse signal of the pulse width during which the injection quantity control solenoid valve 80 is opened to allow the corresponding quantity of fuel to be supplied to the pressure chamber 50. The fuel is fed to the engine 1 through the injection valve in the fixed injection timing. Thus, operation of the engine 1 can take place, even though the fuel injection is not performed with the optimal fuel injection timing. The quantity of fuel fed to the combustion chambers of the engine can be controlled by the operator with the aid of the accelerator pedal, whereby the rotational speed of the engine can be controlled in dependence on the degree of actuation of the accelerator pedal. In this way, even when the main controller undergoes failure, the operability of the engine can be maintained, whereby the associated motor vehicle can be transported with safety to a repairing station.

In the foregoing description, it has been assumed that the timing signal and the injection quantity signal generating circuits 320 and 322 are constituted by the mono-stable multivibrators, respectively. However, it will be appreciated that these signal generator circuits 320 and 322 can be realized in other circuit configurations so far as the same or equivalent functions can be assured. Of course, the multivibrator can be implemented by using transistors or in the form of an integrated circuit. Further, such circuit arrangement may be made that the generator circuits 320 and 322 are disconnected from the power supply source when the main controller 260 is in the normal operation state with the timing signal produced by the timing signal generator 240 being prevented from being supplied to the circuits 320 and 322 except for a period during which failure occurs in the main controller. This can be accomplished, for example, by such an arrangement that the mono-stable multivibrators 320 and 322 are connected to the power supply source and supplied with the timing signal by suitable means operated concurrently with the change-over of the movable contacts 311 and 313 of the switch 312 from the contacts a to the contacts b. The change-over switch 312 may be constituted by a mechanical switch or alternatively by an electronic switch such as a transistor switch element. Additionally, the main controller may contain a means for detecting failure thereof, so that the failure occuring in the main controller 260 can be detected to thereby automatically change over the switch 312.

Furthermore, the invention is not restricted to the electrically controlled injection pumps described hereinbefore in conjunction with FIGS. 3 to 6 but can be applied to other type of the injection pumps provided with the injection quantity control solenoid valve and the timing control solenoid valve.

It will be appreciated from the foregoing description that, according to the invention, the fuel injection timing and the injection quantity of the electrically controlled injection pump for the Diesel engine are controlled by a main controller which is adapted to control the valve opening durations of the injection timing control solenoid valve and the injection quantity control solenoid valve, while in the event of abnormal operation of the main controller, the valve opening durations of the above valves are controlled by a subcontroller constituted by pulse signal generator circuits of a simplified circuit configuration. Thus, the controllable operability of the engine can be assured even in the event of failure in the main controller.

I claim:

1. A control apparatus for an electrically controlled injection pump of a Diesel engine provided with auxiliary means put into operation in emergency, comprising:
    an electrically controlled injection pump provided with an injection timing control solenoid valve and an injection quantity control solenoid valve which are opened in a manner so that the pump operates to supply a desired quantity of fuel to the engine in an optimal injection timing;
    a timing signal generator circuit for producing a timing signal synchronized to rotation of said engine;
    a main controller circuit for producing an injection timing control signal and an injection quantity control signal for controlling the opening durations of both said solenoid valves in accordance with said timing signal and a first predetermined parameter representative of the operating state of said engine;
    a first pulse signal generator circuit for producing a first pulse signal of a fixed pulse width in response to said timing signal;
    a second pulse signal generating circuit for producing a second pulse signal in response to said timing signal, said second pulse signal having a pulse width which is varied in dependence on a second parameter representative of a desired operating state of said engine; and
    change-over switch means which can be changed over between a first state and a second state, wherein in said first state of said change-over switch, said control signals produced from said main controller circuit are each supplied to a respective one of said solenoid valves, while in said second state of said change-over switch, said first pulse signal produced by said first pulse generator circuit and said second pulse signal produced by said second pulse generating circuit are supplied to said injection timing control solenoid valve as an injection timing control signal and an injection quantity control signal, respectively.

2. A control apparatus for an electrically controlled injection pump according to claim 1, wherein said second parameter representative of the desired operation state of said engine corresponds to a degree of actuation of an acceleration pedal.

3. A control apparatus for an electrically controlled injection pump according to claim 1, wherein said change-over switch means is manually changed over from said first state to said second state when failure occurs in said main controller circuit.

4. A control apparatus for an electrically controlled injection pump according toclaim 1, wherein each of said first and second pulse generator circuits is constituted by a mono-stable multivibrator.

5. A control apparatus for an electrically controlled injection pump according to claim 4, wherein the mono-stable multivibrator of said second pulse generator circuit is provided with a time constant circuit constituted by a resistor and a capacitor, the value of said resistor being varied in dependence on the degree of actuation of said accelerator pedal, which represents said second parameter.

6. A control apparatus for an electrically controlled injection pump according to claim 1, wherein said first and second pulse generator circuits are operated in response to the change-over of said change-over switch means from said first state to said second state.

7. A control apparatus for an electrically controlled injection pump according to claim 1, wherein said timing signal generator circuit detects magnetically rotational angular position of a crank shaft of said engine.

8. A control apparatus for an electrically controlled injection pump according to claim 1, wherein both said first and second parameters are determined as a function of acceleration pedal actuation.

* * * * *